US011032847B2

United States Patent
Ribeiro Blard et al.

(10) Patent No.: US 11,032,847 B2
(45) Date of Patent: Jun. 8, 2021

(54) METHOD FOR PROVIDING A LOW-POWER WIDE AREA NETWORK AND NETWORK NODE DEVICE THEREOF

(71) Applicant: FINDSTER TECHNOLOGIES SA, Coimbra (PT)

(72) Inventors: Gabriel José Ribeiro Blard, Coimbra (PT); David Alexandre Oliveira Barroso, Coimbra (PT); Virgílio António Ferro Bento, Coimbra (PT); Luis Pedro Monteiro Paula, Coimbra (PT); Carlos Miguel Brandão Pereira, Coimbra (PT)

(73) Assignee: FINDSTER TECHNOLOGIES SA, Coimbra (PT)

( * ) Notice: Subject to any disclaimer, the term of this patent is extended or adjusted under 35 U.S.C. 154(b) by 119 days.

(21) Appl. No.: 16/341,751

(22) PCT Filed: Oct. 19, 2017

(86) PCT No.: PCT/IB2017/056512
§ 371 (c)(1),
(2) Date: Apr. 12, 2019

(87) PCT Pub. No.: WO2018/073785
PCT Pub. Date: Apr. 26, 2018

(65) Prior Publication Data
US 2019/0306880 A1    Oct. 3, 2019

(30) Foreign Application Priority Data

Oct. 19, 2016 (GB) ...................................... 1617724
Oct. 19, 2016 (PT) ........................................ 109688

(51) Int. Cl.
*H04W 74/06* (2009.01)
*H04W 72/12* (2009.01)
(Continued)

(52) U.S. Cl.
CPC .............. *H04W 74/06* (2013.01); *H04B 1/69* (2013.01); *H04W 16/30* (2013.01);
(Continued)

(58) Field of Classification Search
CPC ... H04W 74/06; H04W 16/30; H04W 52/241; H04W 52/265; H04W 52/365;
(Continued)

(56) References Cited

U.S. PATENT DOCUMENTS

2008/0284531 A1    11/2008  Hornbuckle
2017/0318542 A1*   11/2017  Zhang ................. H04W 52/146

FOREIGN PATENT DOCUMENTS

DE    102015202791 A1    8/2016
WO    2013089747 A1      6/2013
WO    2016148611 A1      9/2016

OTHER PUBLICATIONS

"3rd Generation Partnership Project; Technical Specification Group GSM/EDGE Radio Access Network; Cellular System Support for Ultra Low Complexity and Low Throughput Internet of Things; (Release 13)", 3GPP Standard; 3GPP TR 45.820, 3rd Generation Partnership Project (3GPP), Mobile Competence Centre ; 650, Route Des Lucioles ; F-06921 Sophia-Antipolis Cedex ; France,vol. Geran WG1, No. V2.1.0, Aug. 21, 2015 (Aug. 21, 2015), pp. 1-524, XP050995869.
(Continued)

*Primary Examiner* — Melvin C Marcelo
(74) *Attorney, Agent, or Firm* — Cantor Colburn LLP

(57) ABSTRACT

The disclosure relates to a communication protocol method and device which enables, for example, the live feed of data from sensor nodes in a Wireless Personal Area Network (WPAN) to a centralized node, in particular for low-power long-range communications, further in particular with frequency chirp modulations. The disclosure provides long
(Continued)

range communication with very low power consumption, preferably with a refresh rate of a few seconds per node while operating in the Licensed-Free Industrial/Scientific/Medical (ISM) frequency band, defined by the International Telecommunication Union (ITU). The method and device protocol include Medium Access Control (MAC) and Host functionalities that make the best use a LoRa radio, while keeping a reliable live feed of data from peripheral nodes to a central node, that is capable of managing multiple links, configured to comply with directives from Conformité Européenne (CE) and Federal Communications Commission (FCC) for the license-free radio frequency ISM bands.

23 Claims, 11 Drawing Sheets

(51) Int. Cl.
| | | |
|---|---|---|
| *H04W 52/24* | (2009.01) | |
| *H04B 1/69* | (2011.01) | |
| *H04W 16/30* | (2009.01) | |
| *H04W 52/26* | (2009.01) | |
| *H04W 52/36* | (2009.01) | |

(52) U.S. Cl.
CPC ....... *H04W 52/241* (2013.01); *H04W 52/265* (2013.01); *H04W 52/365* (2013.01); *H04W 72/1231* (2013.01); *H04B 2001/6912* (2013.01); *Y02D 30/70* (2020.08)

(58) Field of Classification Search
CPC ................ H04W 72/1231; H04B 1/69; H04B 2001/6912; Y02D 30/70
See application file for complete search history.

(56) References Cited

OTHER PUBLICATIONS

Huawei et al, "General design principles", vol. RAN WG1, No. Malmo, Sweden; Oct. 5, 2015-Oct. 9,2015, Oct. 4, 2015, 3GPP Draft; R1-155961, 3rd Generation Partnership Project (3GPP), Mobile Competence Centre; 650, Route Des Lucioles; F-06921 Sophia-Antipolis Cedex; France; Retrieved from the Internet: URL:http://www.3gpp.org/ftp/Meetings_3GPP_SYNC/RAN1/Docs/; XP051039784.

International Search Report dated Feb. 27, 2018 re: Application No. PCT/IB2017/056512, pp. 1-4, citing: WO 2013/089747, WO 20161148611 A1, Huawei et al. "General design . . . ", DE 10 2015 202791 A1 and 3GPP Standard "3rd Generation . . . ".

Written Opinion dated Feb. 27, 2018 re: Application No. PCT/IB2017/056512, pp. 1-7, citing: WO 2013/089747, WO 2016/148611 A1, Huawei et al. "General design . . . ", DE 10 2015 202791 A1 and 3GPP Standard "3rd Generation . . . ".

* cited by examiner (a)  (b)

| Slot | Window | Level | Channel (FCC) | Ch. (CE) | Direction |
|---|---|---|---|---|---|
| 1 | $w_1$ | $r_0$ | $c_{1.1}$ | $c_1$ | $C \rightarrow n_1$ |
| | | | $c_{1.2}$ | $c_1$ | $C \leftarrow n_1$ |
| | $w_2$ | $r_3$ | $c_{2.1}, c_{2.2}$ | $c_2$ | $C \rightarrow n_2$ |
| | | | $c_{2.3}, c_{2.4}$ | $c_2$ | $C \leftarrow n_2$ |
| | $w_3$ | $r_5$ | $c_{3.1}, c_{3.2}, c_{3.3}, c_{3.4}, c_{3.5}$ | $c_3$ | $C \rightarrow n_3$ |
| | | | $c_{3.6}, c_{3.7}, c_{3.8}, c_{3.9}, c_{3.10}$ | $c_3$ | $C \leftarrow n_3$ |
| 2 | $w_1$ | $r_0$ | $c_{1.3}$ | $c_1$ | $C \rightarrow n_1$ |
| | | | $c_{1.4}$ | $c_1$ | $C \leftarrow n_1$ |
| | $w_2$ | $r_3$ | $c_{2.5}, c_{2.6}$ | $c_2$ | $C \rightarrow n_2$ |
| | | | $c_{2.7}, c_{2.8}$ | $c_2$ | $C \leftarrow n_2$ |
| | $w_3$ | $r_5$ | $c_{3.1}, c_{3.2}, c_{3.3}, c_{3.4}, c_{3.5}$ | $c_3$ | $C \rightarrow n_3$ |
| | | | $c_{3.6}, c_{3.7}, c_{3.8}, c_{3.9}, c_{3.10}$ | $c_3$ | $C \leftarrow n_3$ |
| 3 | $w_1$ | $r_0$ | $c_{1.5}$ | $c_1$ | $C \rightarrow n_1$ |
| | | | $c_{1.6}$ | $c_1$ | $C \leftarrow n_1$ |
| | $w_2$ | $r_3$ | $c_{2.9}, c_{2.10}$ | $c_2$ | $C \rightarrow n_2$ |
| | | | $c_{2.1}, c_{2.2}$ | $c_2$ | $C \leftarrow n_2$ |
| | $w_3$ | $r_5$ | $c_{3.1}, c_{3.2}, c_{3.3}, c_{3.4}, c_{3.5}$ | $c_3$ | $C \rightarrow n_3$ |
| | | | $c_{3.6}, c_{3.7}, c_{3.8}, c_{3.9}, c_{3.10}$ | $c_3$ | $C \leftarrow n_3$ |

Fig. 14

| Level | Bandwidth | Spreading Factor | Coding Rate (FEC) | Channel Hops |
|---|---|---|---|---|
| $r_0$ | 125kHz | 7 | 2 | 0 |
| $r_1$ | 125kHz | 8 | 2 | 0 |
| $r_2$ | 125kHz | 9 | 3 | 0 |
| $r_3$ | 125kHz | 10 | 3 | 0 |
| $r_4$ | 125kHz | 11 | 4 | 0 |
| $r_5$ | 125kHz | 12 | 4 | 0 |

| Level | Bandwidth | Spreading Factor | Coding Rate (FEC) | Channel Hops |
|---|---|---|---|---|
| $r_0$ | 125kHz | 7 | 2 | 0 |
| $r_1$ | 125kHz | 8 | 2 | 0 |
| $r_2$ | 125kHz | 9 | 3 | 0 |
| $r_3$ | 250kHz | 10 | 3 | 0 |
| $r_4$ | 250kHz | 11 | 4 | 0 |
| $r_5$ | 500kHz | 12 | 4 | 0 |

| Level | Bandwidth | Spreading Factor | Coding Rate (FEC) | Channel Hops |
|---|---|---|---|---|
| $r_0$ | 125kHz | 7 | 2 | 0 |
| $r_1$ | 125kHz | 8 | 2 | 0 |
| $r_2$ | 125kHz | 9 | 3 | 0 |
| $r_3$ | 125kHz | 10 | 3 | 1 |
| $r_4$ | 125kHz | 11 | 4 | 2 |
| $r_5$ | 125kHz | 12 | 4 | 4 |

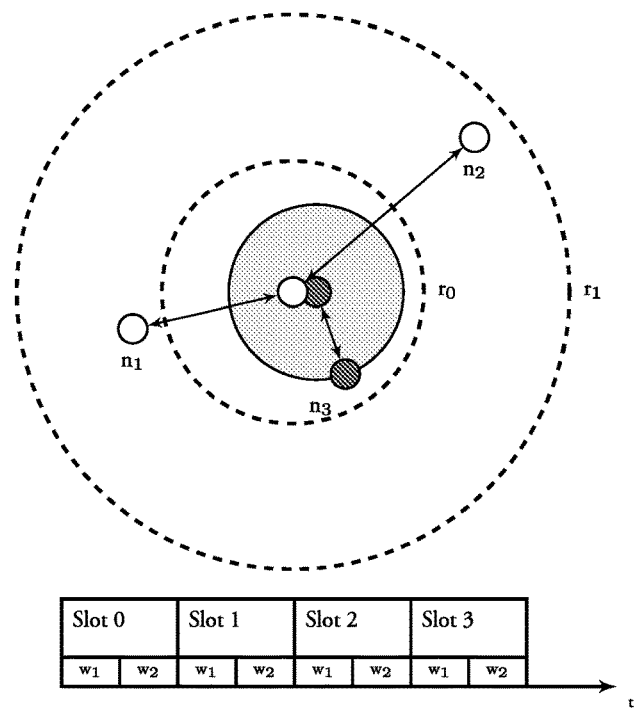
a)
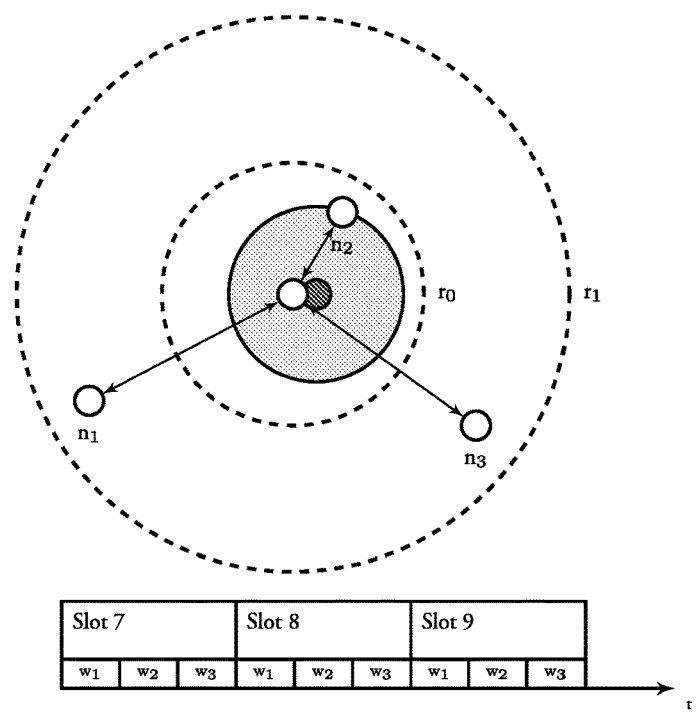
c)
Fig. 20

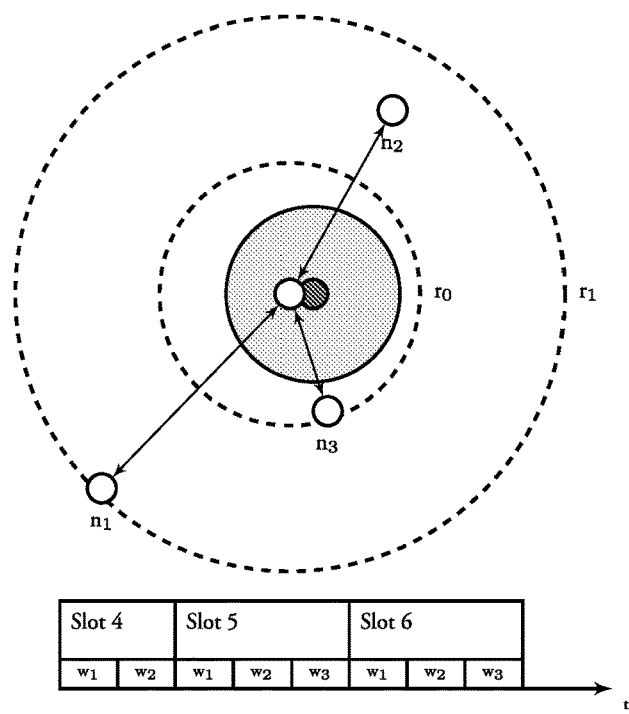
b)
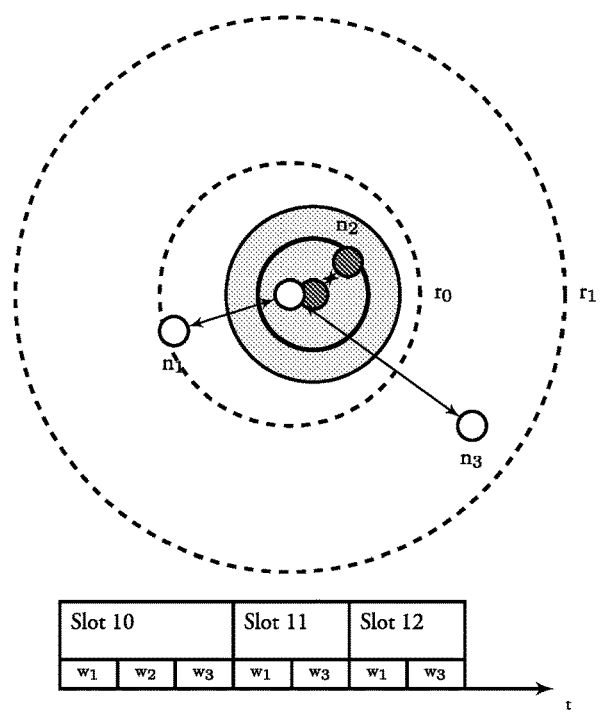
d)
Fig. 20

METHOD FOR PROVIDING A LOW-POWER WIDE AREA NETWORK AND NETWORK NODE DEVICE THEREOF

TECHNICAL FIELD

The present disclosure relates to multiplex communication having circuits or apparatus for combining or dividing signals for the purpose of transmitting the signals simultaneously and/or sequentially over the same wireless transmission medium, in particular with hierarchical frame structures repeating over time, in particular for low-power long-range communications, further in particular with frequency chirp modulations, for example using a fractional-N Phase Locked Loop (PLL).

BACKGROUND

With the proliferation of both Low-Power Wide-Area Network (LPWAN) and Low Rate Wireless Personal Area Network (LR-WPAN) for the Internet Of Things (IoT), that allow long range communication at low bit rates, such as ZigBee and Bluetooth Low Energy (BLE), there is an increasing offer in devices that promote the integration of such communication capabilities into any electronic system.

While some vendors offer turnkey solutions—certified radio modules with integrated protocol stack, providing a simple Application Programming Interface (API) for the developers to use. Others offer state of the art radio front-end Integrated Circuit (IC), which offer improved performance and allow flexibility in protocol design to fit specific application needs.

LoRa is a modulation format that can be generated by Semtech LoRa parts, including the SX1272 and SX1276 transceiver chips. This modulation format is best described as a "Frequency Modulation (FM) chirp". The core that enables LoRa is the ability to generate a stable chirp using a frac-N Phase Locked Loop (PLL) which can be read in: U.S. Pat. No. 7,791,415 B2, which should be considered herewith incorporated in its entirety. Other modulation formats include frequency shift keying (FSK), phase shift keying (PSK), etc. The present disclosure is particularly, but not exclusively, suited to LoRa modulation. The available LoRa parts allow the configuration of different Physical (PHY) parameters (some listed below), that enable the tuning of RF properties to meet some of the application goals:
  Carrier frequency and signal bandwidth;
  Signal immunity vs. power consumption.

It is important to consider that LoRa itself does not describe system functionality above the Radio Frequency (RF) physical medium layer (PHY).

These facts are disclosed in order to illustrate the technical problem addressed by the present disclosure.
General Description The present disclosure is directed to a communication protocol method and device which enables, for example, the live feed of data from sensor nodes in a Wireless Personal Area Network (WPAN) to a centralized node. The disclosure aims to provide long range communication with very low power consumption, preferably with a refresh rate of a few seconds per node while operating in the Licensed-Free Industrial/Scientific/Medical (ISM) frequency band, defined by the International Telecommunication Union (ITU).

The disclosed method and device, also designated onwards as 'maze', enables the creation of small to medium density LPWAN. It includes a communication protocol namely for a 1-N WPAN in a star topology. Each node makes preferably use of a specific radio front-end named LOng RAnge (LoRa) radio, which enables very long range communications and is very low power. This radio device preferably falls in the license-free sub 1 GHz ISM radio frequency band.

The disclosed method and device protocol describes Medium Access Control (MAC) and Host functionalities that make the best use a LoRa radio, while keeping a reliable live feed of data from peripheral nodes to a central node, that is capable of managing multiple links.

The disclosed method and device is designed to comply with both directives from Conformité Européenne (CE) and Federal Communications Commission (FCC) for the license-free radio frequency ISM bands. Specifically, the sub 1 GHz bands, 800 to 900 MHz. In fact, one of its main purposes is to provide an agile method of managing the medium access that maximizes the network throughput, while keeping its compliance with the regulatory directives. Furthermore, one of the disclosure objectives includes addressing the limitations a intentional radiator faces in these networks—namely for ITU region 1, Europe/Africa/Middle East/Former USSR, the transmission duty cycle restrictions imposed by the regulation greatly limit the role an intentional radiator (a central node or peripheral) can play in a network.

For the European Telecommunications Standards Institute (ETSI), the radio module falls in the EN 300 220 V2.4.1 directive. The present disclosure implements, among others, a Listen Before Transmit (LBT) technique in order to comply with the directive and have more loose channel occupation times available—typically, 4 seconds in a ETSI polling sequence.

For the FCC, the radio module falls in the Part 15.247 directive as a hybrid operation Short Range Device (SRD). Since the channel occupation time is very narrow, in the worst case scenario, an adjustment to the link's bandwidth must be made—going up to 500 kHz BandWidth (BW), or a frequency hopping technique must be enabled. Normally, to comply with the requirements for hybrid operation the channel dwell time in frequency hopping mode should not exceed 400 ms, thus for a 3.2 second message with a maximum of dwell of 400 ms in any channel, this requires 8 channels (400 ms*8 channels=3.2 seconds). In addition, the power spectral density should not exceed+8 dBm in any 3 kHz bandwidth.

It is disclosed a method for providing a low-power wide area network, LPWAN, by transmitting and receiving signals between a central node and a plurality of peripheral nodes, using a spread-spectrum frequency-modulated chirp radio modulation, said method comprising:
  predefining a plurality of radio configuration levels by selecting a subset of radio physical layer configurations of all possible radio physical layer configurations, wherein said radio configuration levels are ordered from lower sensitivity processing gain (lower range) to higher sensitivity processing gain (longer range);
  assigning a different channel or a different subset of channels for each peripheral node to communicate with the central node;
  communicating using a periodic time slot comprising a plurality of time windows, each said time window being reserved for one respective peripheral node,
  wherein each said window is reserved for the central node to poll the respective peripheral node and for the respective peripheral node to respond to the central node polling, using the assigned channel or channels to the respective peripheral node, using a radio configuration level selected from the predefined plurality of radio configuration levels.

An embodiment comprises selecting the radio configuration level according to the link quality (which may include lost packet ratio and/or RSSI) between central code and the respective peripheral node.

In an embodiment, the transmission power of the respective peripheral node is adjustable according to link quality, said method comprising:
selecting a radio configuration level with higher sensitivity processing gain if the transmission power is at its maximum, and
 selecting a radio configuration level with lower sensitivity processing gain if the transmission power is at its minimum.

In an embodiment, the radio configuration level is negotiated between the central code and each said peripheral node according to link quality.

In an embodiment, the duration of said window is equal to the duration of the transmission at the lowest data-rate radio configuration level, of a message having a predetermined maximum message length of said LPWAN.

In an embodiment, said frequency modulated chirp radio modulation is LoRa modulation.

An embodiment comprises:
each peripheral node waiting until its reserved time window for receiving signals from the central node and, when polled by the central node, transmitting signals to the central node within said window.

In an embodiment, for the case where a subset of channels is assigned to each peripheral node, for each subset of channels, the channels are used sequentially in each communication, in particular used sequentially and in circular order returning to the first channel after the last channel of said subset is used.

In an embodiment, the LPWAN conforms to FCC regulations or ETSI regulations.

In an embodiment, the number of assigned channels to each subset is sufficient to support a bidirectional communication with the duration of the transmission at the lowest data-rate radio configuration level of a message having said predetermined maximum message length of the LPWAN.

In an embodiment, the central node before polling each peripheral node, listens for channel activity and if, channel activity is above a predetermined threshold, skips the window of said peripheral node window and retries the communication with said peripheral node in the window of the same peripheral node of the next slot.

An embodiment comprises adjusting the time duration of the slot on entry or exit of a peripheral node from the network, such that it has a duration equal or greater than the sum of all peripheral node time windows.

An embodiment comprises, for pairing a new peripheral node with the central node:
 the central node broadcasting a pair request, said request asking for said new peripheral node to pair with the central node;
 the new peripheral node responding to the central node request to accept said pairing request.

An embodiment comprises the central node informing the peripheral nodes of the new node entry to increase the slot duration in order to accommodate the sum of all peripheral node time windows.

In an embodiment, the new peripheral node responds to the central node request to accept said pairing request by emitting a burst of confirmation messages.

An embodiment comprises, for power saving by a peripheral node, said peripheral node entering a sleep state and skipping a predetermined number of subsequent slots until exiting said sleep state to resume communications.

In an embodiment, the predetermined number of subsequent slots of the sleep state to be skipped by the peripheral node is communicated by the central node to the peripheral node.

An embodiment comprises the central node sending a disconnect command to a peripheral node to switch it to a disconnected state.

An embodiment comprises, after sending said disconnect command, the central node listening during the window of said peripheral node for the peripheral node resumption from the disconnected state.

An embodiment comprises the peripheral node when resuming from the disconnected state, sending periodically an entry message in bursts until the central node replies with a message that accepts the entry of the peripheral node.

An embodiment comprises the peripheral node transmitting the entry message to the central node in bursts using the lowest sensitivity processing gain radio configuration level and listening to the central node reply using the highest sensitivity processing gain radio configuration level.

An embodiment comprises a peripheral node, on not having received the central node polling messages after a predetermined amount of time, entering an emergency mode which comprises broadcasting an emergency message periodically on an emergency-reserved channel using the highest sensitivity processing gain radio configuration level.

An embodiment comprises the central node listening on the emergency-reserved channel whenever the central node communications are idle, in particular during windows which have been skipped for power-saving by a peripheral node and/or during the remaining time of a window whose peripheral node communication has not used the window full duration.

An embodiment comprises the coupling of said LPWAN, according to the disclosed embodiments, with a Personal Area Network (PAN), e.g. Bluetooth Low Energy, that when present may connect up to every LPWAN network node, within the range of said PAN, to its master, e.g. a Smartphone.

An embodiment comprises, when coupled with a PAN, the possibility of triggering specific operations, in particular: the handover of the communication of a specific peripheral node from the PAN to the central node via LPWAN; to have the central node listen to the emergency channel for a specific amount of time; to populate the LPWAN tables of any node with the network—replacing the pairing process and/or reassignment of network peripheral nodes to other network central nodes.

In an embodiment, coupled to a PAN, a method is disclosed to perform the handover of the network peripheral links, from the PAN to the LPWAN, when the connection of a peripheral node to the PAN is lost. The PAN configures the network central node to dynamically reserve a communication windows within communication slots. The method maximizes the peripheral node's throughput, by keeping the communication slots occupied only with the LPWAN active nodes, and minimizes loss of synchronism, by efficiently recovering the network peripheral node connection to the PAN when the accessed signal quality is considered good/high.

An embodiment comprises connecting any said peripheral node, or said central node, or any said peripheral node and said central node, by a personal area network, PAN, with a PAN master node.

An embodiment comprises defining a table of pair-wise network IDs matching a LPWAN ID with a PAN ID for each node.

An embodiment comprises allocating a reserved time window to a peripheral node by communication with said peripheral node using said PAN.

An embodiment comprises handing over communication between a peripheral node and the central node, to said PAN or from said PAN, through said PAN master node.

In an embodiment, the LPWAN reserved time window is maintained until communication has been handed over to said PAN and, subsequently, the PAN link RSSI is above a predetermined threshold.

An embodiment comprises maintaining peripheral node or nodes in a discoverable mode and/or advertising mode on said PAN, such that the PAN master node can resume a PAN communication with a peripheral node that has lost PAN communication using said mode.

In an embodiment, the PAN master node is a smartphone or a tablet.

In an embodiment, the PAN master node is also the LPWAN central node. In this case, when the LPWAN is the central node itself, it may or may not have a smartphone or tablet as slave to the PAN for the purpose of interfacing with the data consumer and/or network manager.

In an embodiment, said PAN is Bluetooth, in particular Bluetooth Low Energy, BLE.

It is disclosed a non-transitory storage media including program instructions for implementing a low-power wide area network, the program instructions including instructions executable to carry out any of the disclosed methods.

It is disclosed a low-power wide area node network device comprising the preceding non-transitory storage media.

It is disclosed a low-power wide area peripheral node network device or central node network device configured for carrying out any of the disclosed methods.

Low-power wide area node network device for performing, either as a central node, or as a peripheral node, configured for carrying out any of the disclosed methods.

BRIEF DESCRIPTION OF THE DRAWINGS

The following figures provide preferred embodiments for illustrating the description and should not be seen as limiting the scope of invention.

FIG. 14: Schematic representation of an embodiment of the Channel Usage under the FCC and CE directive.

FIG. 20: Schematic representation of an embodiment of network central and peripheral nodes in a LPWAN network coupled with a PAN.

DETAILED DESCRIPTION

Figure 1:
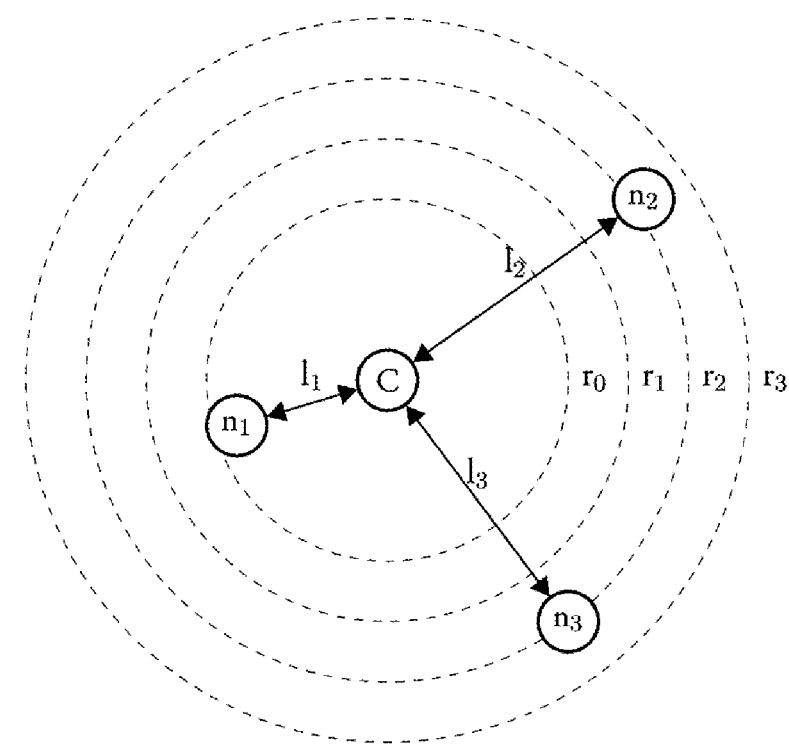
FIG. 1: Schematic representation of an embodiment of the network topology, where the network is configured in a 1-N Star topology where C is a central node that concentrates all the data generated by the nodes $n_1 \ldots _M$ by keeping a bidirectional link with them, $l_1 \ldots _M$. To optimize the network's energy efficiency, C assigns the radio's physical configuration parameters to each of its links based on a signal quality indicator. The dashed lines indicate the maximum range for a link given a specific radio configuration, $r_0 \ldots _R$. Thus, node $n_1$ is reachable by any of the radio configurations $r_{0-3}$ and nodes $n_2$ and $n_3$ are reachable by any of the radio configurations $r_{2-3}$.

The network is usually built in star topology where a central node, C, acts as the network manager and data concentrator, while the peripheral nodes, n, are simple nodes, typically sensor nodes, that react to C's commands through a bidirectional link, l, see FIG. 1. Furthermore, C must analyze the link Quality Of Service (QoS) and adapt the LoRa's PHY parameters so it can communicate with nodes that are at larger distances, r being the distance between c and each node.

In FIG. 1, the network is configured in a 1-N Star topology where C is a central node that is able to concentrate all the data generated by the nodes $n_{1 \ldots M}$, by keeping a bidirectional link with them, $l_{1 \ldots M}$. The dashed lines indicate the maximum range for a link for a specific radio configuration, $r_{0 \ldots R}$. The various configurations are orthogonal, meaning that two systems operating at the same time with different configurations will not collide (i.e. the nodes in different configurations will communicate independently and will not be able to 'hear' each other).

Figure 2:
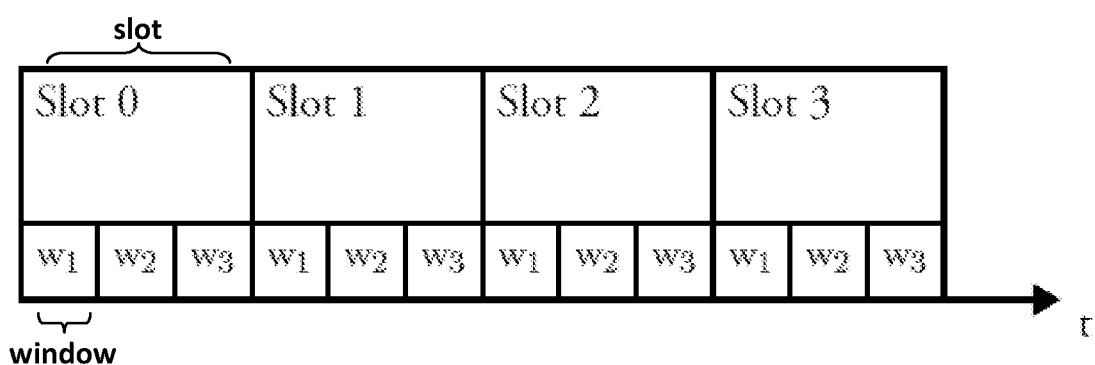
FIG. 2: Schematic representation of an embodiment of the slotted time division of the communication links. Each slot comprises a time window assigned to each of the nodes, n0, ..., nN.

C can accept new node entries and manage each link using the presently disclosed technique. This process can be represented as subsequent time slots (Slot0, Slot1, Slot2, Slot3) and, in each slot, C has a reserved time window (w1 for n1, w2 for n2, w3 for n3) for the communication with each peripheral node. The peripheral node wakes periodically and waits, in a listening state, for their corresponding message, see FIG. 2.

Figure 3:
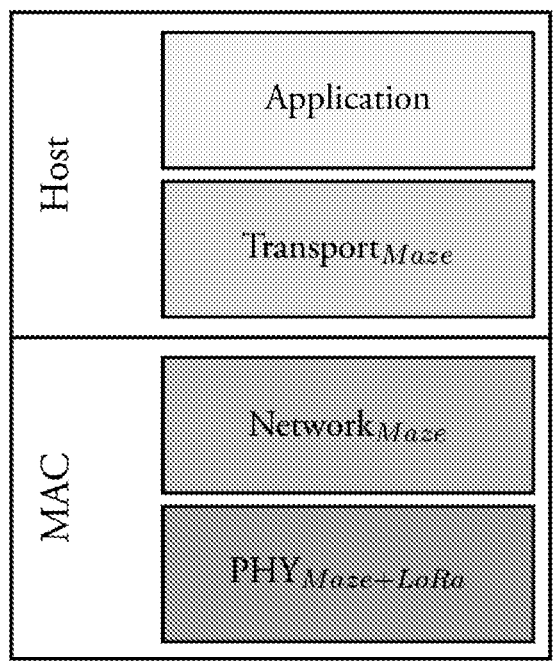
FIG. 3: Schematic representation of an embodiment of the protocol stack.
Figure 4:
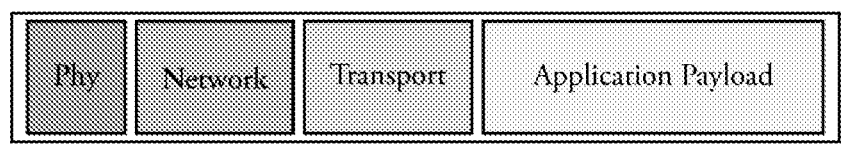
FIG. 4: Schematic representation of an embodiment of the fields in a message according to the disclosure.

The protocol stack, represented in FIG. 3, is a simplified version of the one defined by the Open Systems Interconnection (OSI) Model. The disclosed protocol adds MAC and Host functionalities. It extends the PHY layer and implements its own Network layer; it also adds a Transport layer for a general application to encapsulate its data to the message.

The goal for the PHY layer's extension is to increase the network overall throughput. This is done by balancing the medium's load among the multiple channels available for the unlicensed sub 1 GHz ISM RF spectrum. Furthermore the PHY layer adapts to the environment and assures a reliable transmission by reconfiguring a link (changing the mentioned radio configuration) to have better immunity to external disturbances and perform with wider range.

The Network layer structures the multi-node network and adds a time-triggered dispatcher to the messages, keeping the periodic links synchronism. This layer is responsible for managing the slotted communication timings, and provide methods to pair/un-pair nodes and start/stop operation. A Transport layer is also described in this document. It allows for a general application to encapsulate its data to the message's application payload. It also provides a simple API for configuring some communication parameters, such as a link's periodicity, or to trigger special operation modes.

The network's message is defined according to the disclosed protocol stack. Each field is processed in sequence by its respective layer and forwarded to the upwards.

The disclosed method for a central host to manage new nodes in a LP-WAN is characterized by comprising the following:

(a) Assigning an identifier to new links (b) Allocating a time window and a specific RF channel to the link (c) Reconfigure a link's periodicity and RF proprieties The disclosed method includes steps for a central host to adapt the RF properties of any single link based on its QoS. The disclosed method includes steps to dynamically reconfigure slot durations and accommodate new links in the network. The disclosed method includes a power conserving mechanism to save a specific node's energy. The disclosed method includes steps for a node to stop a session and then restart operation.

The disclosed extension to the PHY layer has two main purposes. One being the load balancing of the available RF channel's. The other, to maintain reliable links. This is done in particular by assessing the channel's activity before a transmission and, also, by evaluating the link's QoS to adapt its RF properties. Since there are some differences to both regulations, CE and FCC, for the sub 1 GHz ISM band, concerning the total number of available channels and maximum channel occupancy time, the PHY load balancing method optionally also differs.

Figure 5:
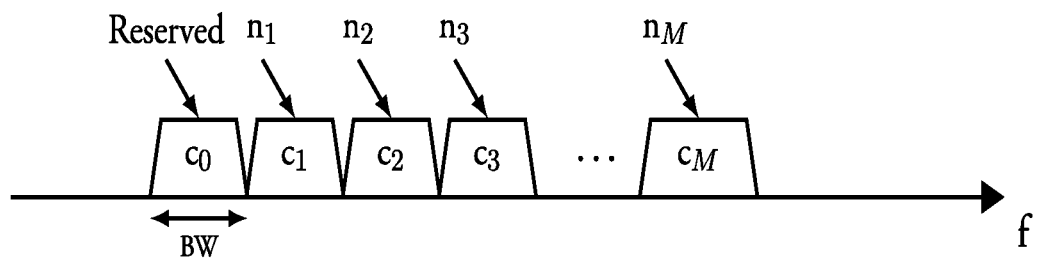
FIG. 5: Schematic representation of an embodiment of each available channel being allocated to a specific link under CE regulation where there are fewer channels available, but a wider maximum channel occupation time.

For the CE regulation there are only a few available channels ($C_0$-$C_K$), each channel having a narrow bandwidth (BW) of 125 kHz, but a wider maximum channel occupation time which suits the disclosed network's needs. Therefore, to each peripheral node a single channel is assigned, which means that the polling sequence takes place in a single channel for each node, the channel attribution is illustrated in FIG. 5. Preferably but not mandatorily, under the European regulations, the maximum dwell on a single channel will be sufficient for both sending and receiving a message between two nodes.

Figure 6:
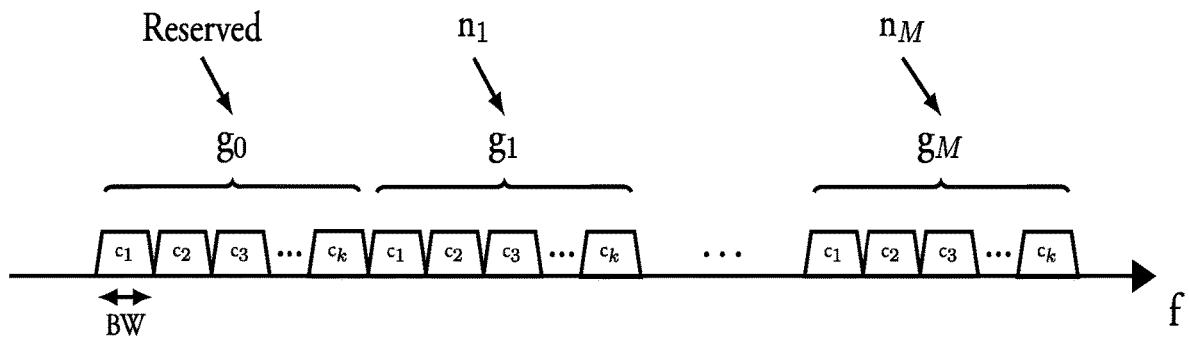
FIG. 6: Schematic representation of an embodiment of a group of channels being allocated to each link under FCC regulation where there are more channels available, but with narrower maximum channel occupation time.

The FCC regulation provides a wider total bandwidth that, under the hybrid operation directive, can be subdivided into any number of channels at to each peripheral node different bandwidths (125 kHz, 250 kHz, 500 kHz, having constraints in channel spacing and power spectral density. Despite having more channels available the maximum occupation time for each, within a certain period, cannot exceed 400 ms which is much shorter than available under European regulations. Therefore, a group of channels ($g_1$-$g_3$) is assigned to each link, see FIG. 6. Each group of channels is composed of enough channels ($c_{x,1}$-$c_{x,k}$) to support the bidirectional link when configured for the longest air time—r5. When, in a preferred embodiment, the maximum air-time needed is 3.2 seconds—10 channels are reserved per group in order to be able to poll this specific node at its maximum frequency, i.e. occupying the totality of each channel's available dwell time and duty-cycle, see FIG. 14.

Each polling sequence usually takes at least two channels, one for each direction, but, depending on the maximum-length message transmission time, it can take more channels for each direction. The communication channel keeps incrementing channels for the subsequent windows making each link rotate all channels in its group, see FIG. 14. Under the US regulations, for longer range communications, the maximum dwell on a single channel will not be sufficient for sending a single message between two nodes, thus requiring a plurality of channel hops. Furthermore, in order to comply with the directive, when a single message duration exceeds the specifications, the radio uses a channel hopping mechanism, thus transmitting a fragment of a message per channel, see FIG. 7.

This happens within each window of each slot, such that the overall method structure is similar between European and American regulations, providing stability and timing certainty to the application layers, independently of the regulations in force where the system is being used.

The first channel, or a predetermined channel, or a predetermined group of channels (FCC), can be reserved for some specific methods. One being the pair process—this is the first step performed by each peripheral node that has not joined any network yet. After which, the node will be assigned to a specific channel/group according to its assigned logic ID (n1, n2, nk). The Reserved channel operation is preferably restrained to a very short range (r0) configuration. Doing so, the protocol can benefit from better data rate, for ex. during the pairing process, thus being able to perform more intense tasks which are normally required during pairing. This is also usual because the pairing process is normally carried out in close proximity between the central node and peripheral node for comfort reasons for the user.

In a preferred embodiment of the polling sequence, the central node always starts the communication with each of the peripheral nodes. In order to assess a channel's availability, the central node C starts a LBT routine—C listens for channel activity for a specified amount of time. If its activity is below an established level the channel is considered free to use and the polling sequence takes place, otherwise C skips that node's window and will only retry in the next slot. The peripheral node issues a timeout and enters idle mode, notice node $n_2$ in FIG. 15.

In a polling sequence the Receiver Signal Strength Indication (RSSI) of a link is measured in both directions. As it is being polled by C, a peripheral node reads the RSSI of the packet and echoes the measured value back. As C gets the reply it takes its own measure. Both values are taken into account, for example averaged and filtered, or alternatively the lowest value is used and filtered, to obtain a link quality estimation. This data allows the central unit to adjust to the environment and increase its range efficiently by changing the configuration of that link RF properties at subsequent slots.

Additionally, a packet counter keeps track of lost packets. If the counter reaches a predefined value it is considered that the link has very poor QoS, this triggers the radio module, peripheral and central nodes, to take action on the configuration of their link RF properties, for example using extreme long-range (i.e. usually slower) settings. The LoRa radio allows the configuration of its PHY properties, such as modulation parameters, that have direct influence in signal immunity, link range, power consumption and airtime (total message transmission time). These parameters can be tuned using the link quality estimation and/or the lost packet counter described above.

Figure 7:
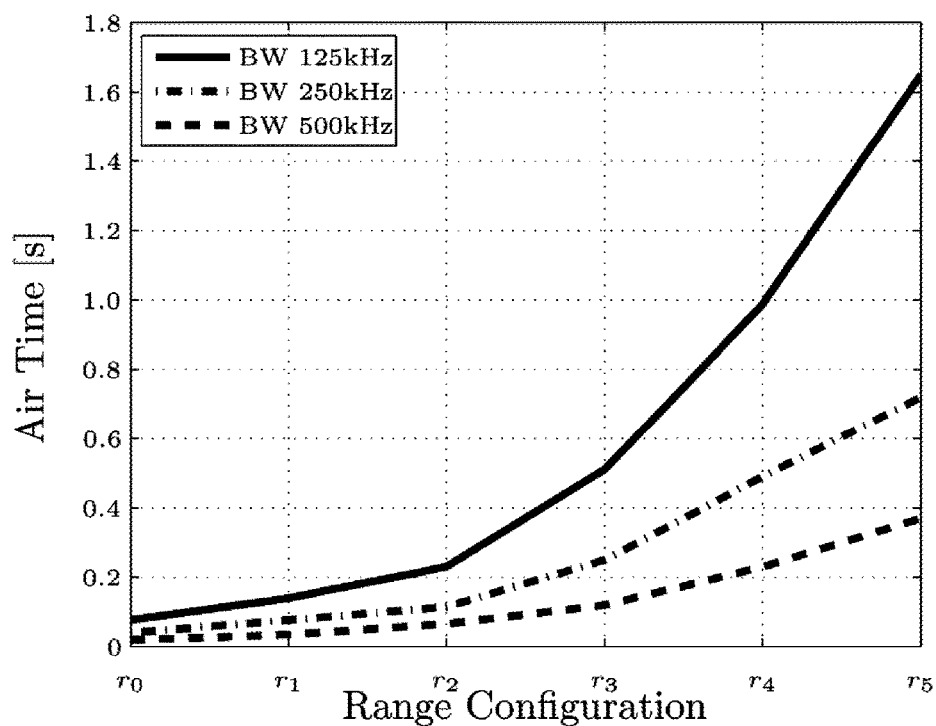
FIG. 7: Schematic representation of the curve for the total air time vs. configuration level for an embodiment, where for the worst case (BW=125 kHz) the number of hops needed per level (fixed payload of 16 bytes): r0—0 hops; r1—0 hops; r2—1 hops; r3—3 hops; r4—5 hops; r5—9 hops.

In FIG. 7 the curve for the total air time vs. configuration level is shown for the FCC regulations for transmitting and receiving 16 bytes. For a given bandwidth (FCC regulations provide choice of bandwidths), a radio configuration for longer distances will require a longer airtime, for a given message size. The power consumption, signal immunity and link range are directly and positively related to the total airtime of a packet with fixed length. For example, for a fixed 16 bytes payload packet configured to have longer duration and further distance with an $r_5$ configuration (for ex. BW=125 kHz and maximal immunity, we have approx. 1.62 s) for transmitting the full message (1.62 s/400 ms=4.05 which thus requires 5 channel dwells and consequently 4 channel hops). So, for a message with 16 bytes of application payload, the total number of channel hops that the PHY must perform in order to send the same message within the FCC regulations, for the 125 Khz bandwidth, is as follows: r0—0 hops; r1—0 hops; r2—0 hops; r3—1 hops; r4—2 hops; r5—4 hops.

It takes at least two slots for the reconfiguration to take action: in the first slot, the evaluation of the link QoS is possible by the central node using the link's RSSI measured value in both directions (referred to as echo above); in the second slot, the communication of the new LoRa PHY parameters to the peripheral node by the central node, after which the link can be reconfigured successfully. Since, for a fixed payload length, the total airtime of a packet can change—depending on the radio physical configuration—the total time window assigned to each node, within a slot, must accommodate the longest packet duration possible added to the extra LBT time, thus avoiding overlap with the subsequent window.

Figure 8:
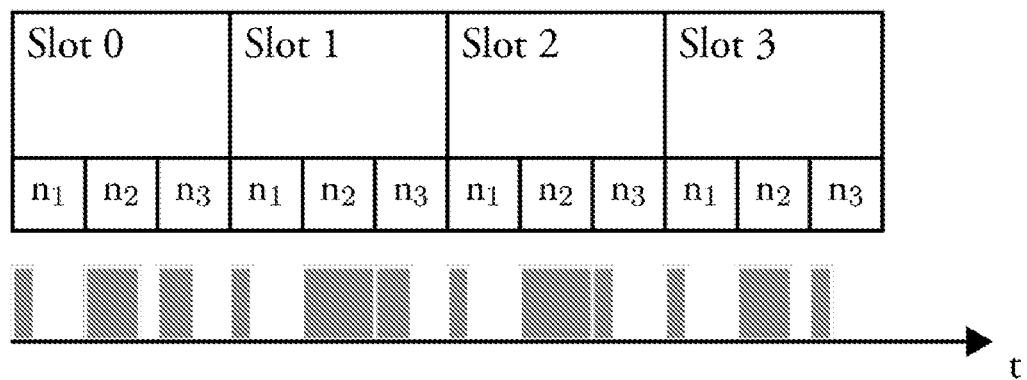
FIG. 8: Schematic representation of an embodiment of nodes being polled in a slot configuration with different message duration—different RF properties (i.e. a different radio configuration causing shorter or longer message time duration, assuming the payload has same byte size).

The network is composed of mobile nodes that move freely in space (as can be C, also a mobile node), so C must dynamically adapt to the environment and distance. An example of this mechanism is given in FIG. 8 where the window's occupation time for each node can be seen. In the figure, node $n_1$ has a good QoS in every slot, so, at a low configuration level, it has very small occupation times. As for node $n_2$ and $n_3$ we can see that the total window occupation changes with time.

$n_3$'s link quality gets an higher rating, so it is configured to operate in a more energy efficient mode, hence the total airtime will be reduced over time. On the other hand $n_2$'s link quality gets a lower rating, so it gets to maximal window occupation at slot 2 and 3, then, after being reevaluated, comes back to its previous configuration.

Figure 10:
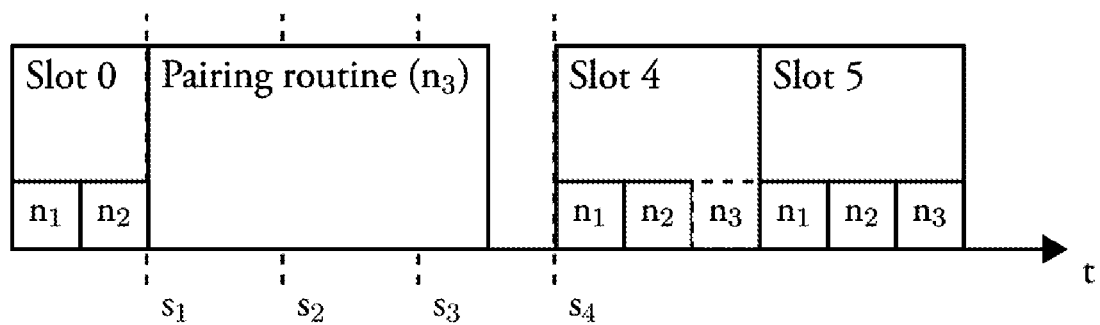
FIG. 10: Schematic representation of an embodiment of the pairing routine, wherein this process maintains track of the slot timings in order to keep synchronism with the previous links; After a pair command is issued by the host, the central node C finishes its current slot tasks (Slot 0), then it halts the polling sequence of subsequent slots, and starts an asynchronous pairing method (optionally, occupying a fixed number of slots or a variable number of slots—as many slots as required for the pairing method—in this case 3 slots—slot1, slot2 and slot3). With a successful pairing of a new node $n_3$, at Slot4, both $n_1$ and $n_2$ are informed of the new node entry, hence the total slot duration is increased for every node in order to accommodate all three node windows for this Slot4 and subsequent slots (e.g. slot5).

The time duration of the slot is defined by the total time duration of the node windows—as seen below in FIG. 10, the time duration of the slot can be adjusted as nodes enter or leave the system. The time duration of the window is defined by the longest time required to transmit and receive a message between two nodes (for the FCC regulations, this time will normally require the mentioned channel hops in order to respect the maximum channel dwell time).

The LoRa Radio allows the configuration of the following parameters: signal bandwidth (125 kHz, 250 kHz or 500 kHz); 4 levels of cyclic error coding to employ Forward Error Correction (FEC); and 7 levels for the spreading factor (code encoding) which increases sensitivity processing gain—so link budget and range, of the Lora receiver.

Figures 15, 16:
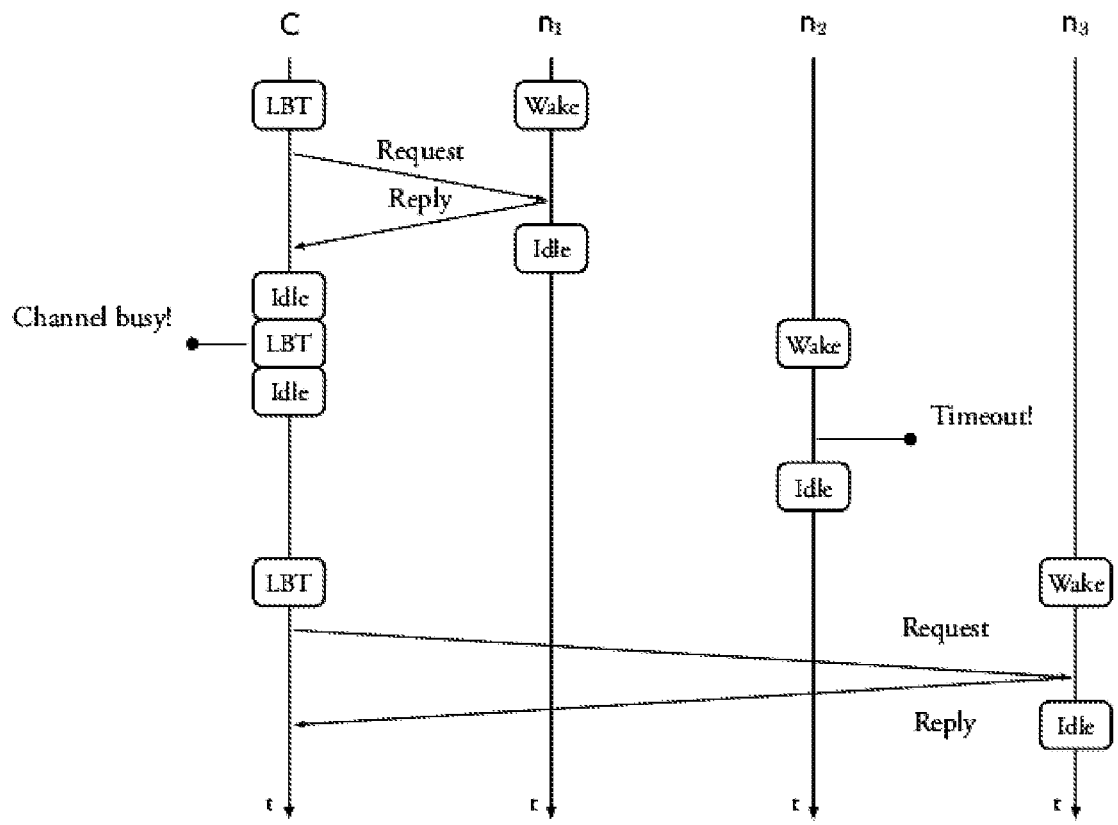
FIG. 15: Schematic representation of an embodiment of a polling sequence where channel c2 is occupied by external signals, therefore C skips n2's link.
FIG. 16: Schematic representation of an embodiment of predetermined configuration levels description—under the CE directive.
Figures 17, 18, 19:
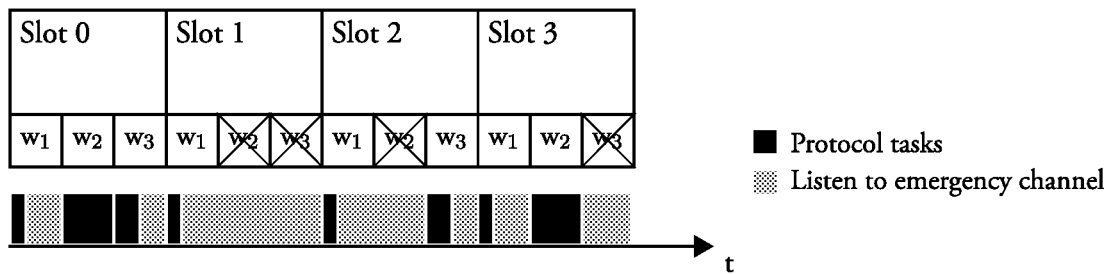
FIG. 17: Schematic representation of an embodiment of predetermined Configuration levels description—under the FCC directive (w/o frequency hopping).
FIG. 18: Schematic representation of an embodiment of predetermined Configuration levels description—under the FCC directive (w/o frequency hopping).
FIG. 19: Schematic representation of an embodiment of the emergency channel listening availability of a central node in a possible communication pattern.

In the disclosed protocol, a subset of all the possible combinations of the above stated parameters were chosen—defining the r0-r5 levels as shown if FIGS. 16, 17 and 18—for example assuming a number of 6 levels. They are the result of various field tests that where designed to obtain commitment between power consumption, message airtime, maximum range and communication reliability for both open field and urban environments being ordered from lower sensitivity processing gain to higher sensitivity processing gain. For example, in FIG. 17, even if bandwidth increases, the spreading factor and coding rate cause a lower data rate and provide longer distances as the level goes from r0 to r5.

Within each r0-r5 level, a power ramp optimizes the Transmitting Power, also configurable (linearly from +2 dBm to +17 dBm in 11 dB programmable steps), is increased in steps of 2 dBm based on the link's QoS estimation. So when a link RSSI, measured by C, is below or above a predefined threshold, the peripheral node is informed and reconfigures itself in for the subsequent windows, as stated above (see reconfiguration passages of the present text). The power ramp is the first to take action, and, only if at link is at its maximum or lowest power level, the configuration level (r) is then, respectively, incremented or decremented.

Since the frequency channel occupation time and duty-cycle is very limited for each node, the number of defined levels (6) and thresholds were chosen in such way that the network links are able to perform the configuration a ladder smoothly, i.e. each level has enough margin for a node, running freely in space, does not get out of range within each configuration cycle. Even so, if a link, for any special reason, has a huge drop on its RSSI, its configuration, according to a preferred embodiment, is automatically adjusted to r5 and the link performs the ladder upside down. Thus, it is understood that more or less levels could be defined, depending on the chosen radio configuration parameters, but having due regard to the objective that the network links are able to perform the configuration a ladder smoothly when changing between said levels.

Figure 9:
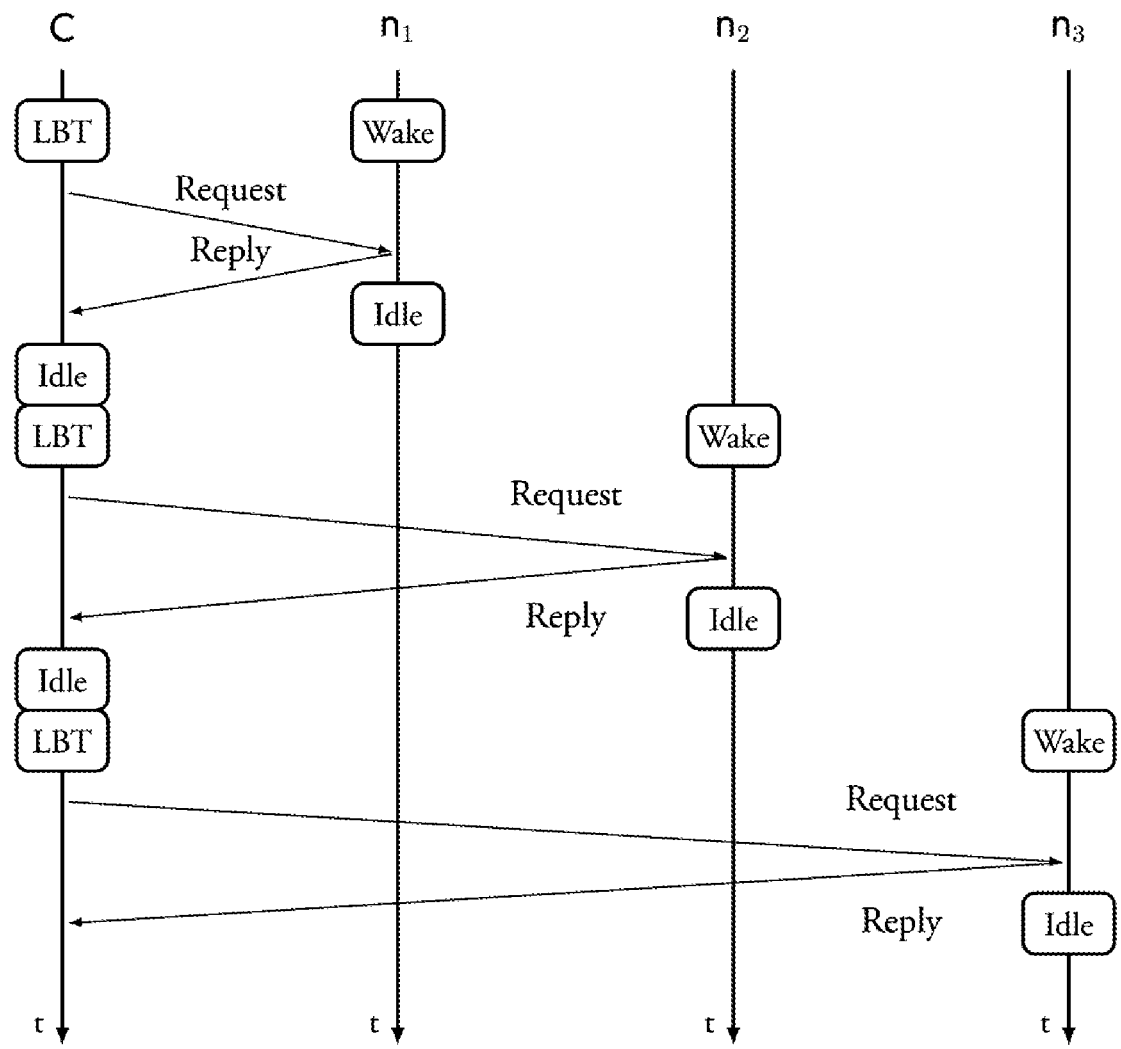
FIG. 9: Schematic representation of an embodiment of periodic polling sequence of every node in the network.

The disclosed network layer has to manage multiple links in the network. It handles all the node's information such as address, session activity status, operation mode, channel's QoS etc. From the central node point of view, the Network layer implements a scheduler that, based on a previous state, protocol message or application command, produces a specific message for a specific node and waits for its reply. As mentioned throughout this document, this procedure follows a TDM mechanism that polls data from N nodes in a WPAN distributed in time slots. From a peripheral node point of view, the Network layer triggers a periodic wake-up of the radio module and waits in a listening state for an incoming message. It then replies to the received message, accordingly, and the radio module returns to idle. These procedures are illustrated in FIG. 9.

The pairing of any new node to a disclosed WPAN is asynchronous to the polling sequence and it occurs in a predefined reserved channel. FIG. 10 shows a possible pairing routine. After a pair command is issued by the application C must first finish its current slot polls (say slot 0). It the starts the pairing process described in the paragraph below, this process keeps track of the slot timings in order to keep synchronism with the previous links (skipping slots 1, 2 and 3) (see discussion above for FIG. 10, explaining how slots 1-3 are skipped during the pairing process). At Slot 4 the polling resumes and both $n_1$ and $n_2$ are informed of the new node entry so they increase the total slot duration (decreasing the global node's refresh rate) in order to accommodate all nodes.

Figure 13:
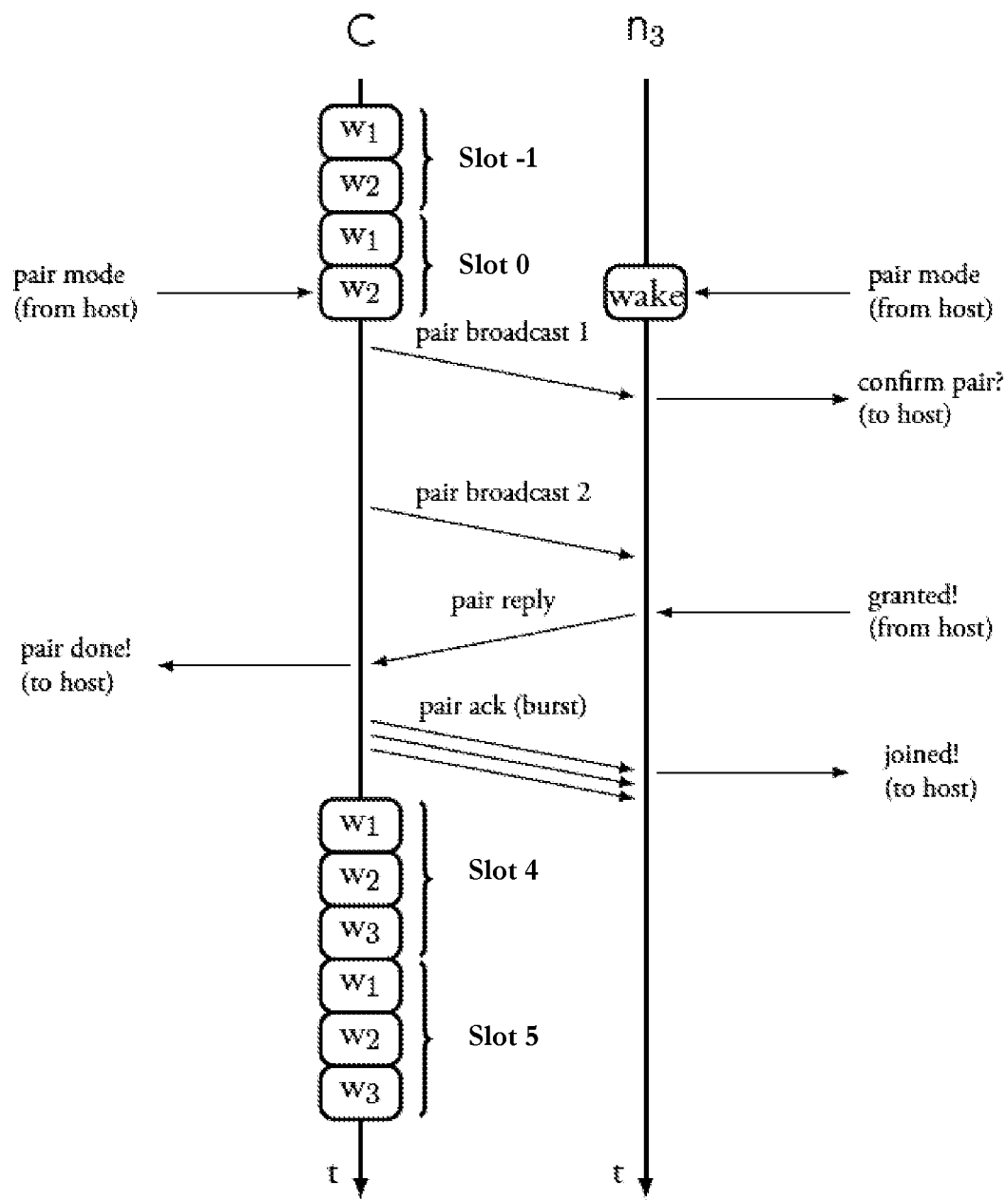
FIG. 13: Schematic representation of an embodiment of the pairing routine triggered by the host. The disclosed network protocol signals the host and waits for its reply for the method to conclude.

For the pair method to start (see FIG. 13), the peripheral node must be in pairing mode to, which consists of waiting in listening state for a pair request from any network. The central node broadcasts a pair request containing its network address and waits for a reply. Preferably, the central node broadcasts periodically the pair request because the peripheral node may not yet be in pairing mode or because of any communication break (see for example broadcast 1 which did not receive a response). Any peripheral node, having received the request, then signals the application host for a user confirmation and reply to the caller using the received network address. The reply contains the node's unique address and additional application payload. C registers the node that sent the reply first, while the other nodes, that may have been in pair mode too, will eventually issue a timeout and return to idle state. Then C sends response, preferably by a small burst of confirmation messages (for redundancy), containing the new paired node's network information, logic ID and communication channel, see the flow diagram in FIG. 13.

Figure 11:
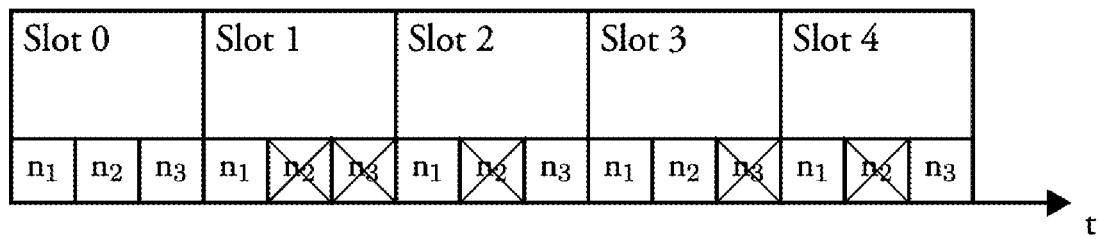
FIG. 11: Schematic representation of an embodiment of the power management mechanism consisting of having a node skip K succeeding communication slots.

To increase a node's energy efficiency the host application can adjust its link periodicity, in multiples of the slot duration, through a simple API command—a command normally sent by the central node to the peripheral node. FIG. 11 illustrates this mechanism which consists of making a node skip subsequent slots extending its idle period (i.e. not waking for its window at every slot, but waking for its window in a certain slot by skipping one or more slots where the peripheral node stays dormant, i.e. in FIG. 9 the node does not issue a 'reply'). Preferably, this periodic skipping schedule is also implemented by the central node, such that the central node does not issue requests for the skipped slots (i.e. in FIG. 9 the central node does not issue a 'request').

For very low-power applications a very long polling period can be set for specific nodes. However, to maintain synchronism, the maximum number of slots that can be skipped must be defined—taking to account clock deviations and jitter in the specific application system. Hence a message takes place automatically, at a predefined minimum rate, from the central node to the peripheral node, resynchronizing the peripheral node clock and resetting its counter of the maximum number of slots that can be skipped. This minimum rate message can be a very short unidirectional (no actual payload is required for resynchronizing the peripheral node clock).

Another special operation that takes place, according to an embodiment, on the reserved channel, is the emergency protocol hereby disclosed. If a peripheral node misses the central node's polls for a predefined period of time it starts broadcasting an emergency message periodically on this reserved channel, using the most reliable configuration (r5). If this feature is enabled, the device performing as a central node can process this message and forward it preferably to a web-server, where the node owner can access the data. If configured so, according to a preferred embodiment, every central node C, of a plurality of networks according to the present disclosure, will be listening to the reserved channel instead of going idle between protocol tasks, as illustrated in FIG. 19. Ultimately, one or more central nodes can be configured to perform the single task of processing the emergency messages, which enables the deployment of an infrastructure that covers larger urban areas, for example.

A field in the Network layer packet sent by the central node is able to issue a command to terminate a specific node's session, thus causing the peripheral node to turn off all its radio functionalities and thus saving power by the peripheral node. It is up to the host application to trigger the procedure that restarts operation so the node can, again, join the network by its own with an 'Enter Session' command. The central node, will then subsequently keep the window open for this node but will only use this window for listening, awaiting the peripheral node returning to active communication. This saves power by the central node, as well.

The enter session method (see FIG. 12) has the peripheral nodes starting the communication instead of the central node. The former is always checking for a node's reentry command, at its specific channel, and during its predefined time window, keeping its operation with the remaining nodes. The peripheral node will eventually barge into its place in the queue. This procedure only happens after a Terminate Session command occurs or due to a system fault, for instance when the peripheral node's battery is completely drained and later recharged.

Figure 12:
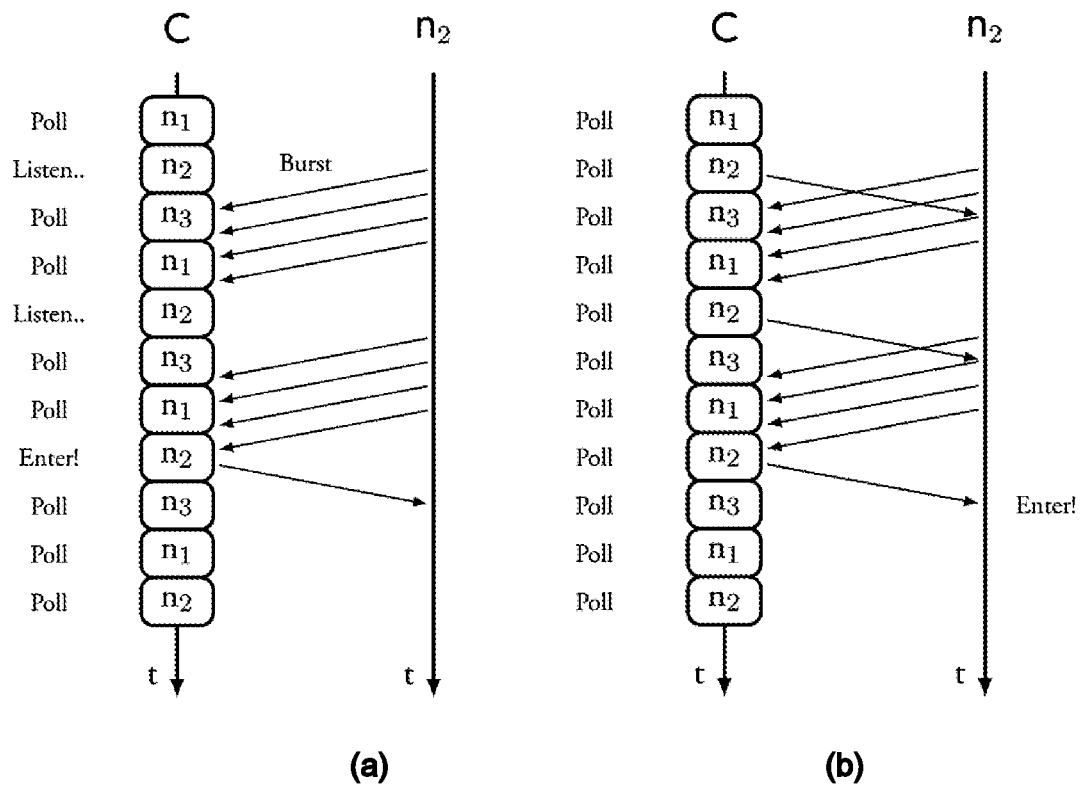
FIG. 12: Schematic representation of an embodiment of the enter session method which is a special operation mode where the peripheral nodes start the communication instead of the central node.

As illustrated in FIG. 12($a$), the peripheral node ($n_2$) sends the Entry message in bursts, periodically—in order to ultimately reach C during $n_2$'s time window, where it will be waiting in a listening state for this specific command in a predetermined channel (a specific predetermined channel or the first of a specific predetermined group of channels, as mentioned in connection with FIGS. 5 and 14). If succeeded C will then reply to this command and the link synchronism will be recovered. C's polling sequence can now take place normally. Preferably, to perform bursts within the regulations (stated above) the message air time must be as low as possible—the burst is preferably sent in a short quick configuration, as in $r_0$, and consequently C listens in the same configuration $r_0$.

A backup method is implemented in this procedure the design, see FIG. 12(b). If, by some fault of the peripheral node, C was still polling for $n_2$ but the later $n_2$ was in a sleep or disconnected state. When $n_2$ starts performing the Enter Session bursts the protocol must recover synchronism and resume the polling sequence as soon as possible.

The backup process is difficult to implement if the radio configuration for the link is taken into account. Since C has been polling $n_2$ for a while, and, without any reply, its link will eventually be reconfigured to the most robust slow long-range configuration, as if it were in the $r_5$ region, (as stated above). Hence, $n_2$ has to be configured accordingly in its listening state ($r_5$). However, to perform bursts within the regulations (stated above) the message air time must be as low as possible—the burst is sent in a short quick configuration, as in $r_0$. This way, C must be configured accordingly ($r_0$) when waiting for the Enter Session message in a listening state, see FIG. 12(a). So, in this specific procedure, for $n_2$ to accommodate both messages, the reply to its burst or a common polling sequence, the peripheral radio must be configured in the burst transmission with $r_0$ and in reception with $r_5$. This way the reentry of a node to the network is issued when n2 receives C's polling message and resumes polling operation as if it was never terminated.

A simple Transport layer is described so that a general application can encapsulate data to a packet. The Transport layer consists of a simple encapsulation method. When data is ready for transmission it should be loaded to its transport function where it should wait for dispatch. The Application layer is then flagged with an end of transmission event. It is up to the system developer to compress data and to optimize the application payload usage. Additional layers can be created above the Transport in order to meet specific application goals. The presented Protocol was particularly designed for a 16 bytes application payload. However, if required by a specific application, a larger data packet can be split in several 16 bytes packets or longer payloads may be used for example 24 bytes. Have in mind that the disclosed protocol implements a LR-WPAN and, this way, applications that rely on heavy data transmission or high sampling rates will be affected by the slow communication.

FIG. 20 shows a schematic representation of an embodiment of network central and peripheral nodes in a LPWAN network coupled with a PAN.

The disclosed method of performing the links handover is illustrated at four different states. a) The network central node is within the PAN range, node 3 is at the PAN range limit and node 1 and 2 are out of PAN range, thus appearing in the slot distribution illustrated bellow. In b) Node 3 is now (slot 5 onwards) handled by the network central node via LPWAN as it moved further away from the PAN master. c) Node 2 is now in range of the PAN but it is still polled by the LPWAN network central node. d) Node 2 has a good signal quality within the PAN and is removed from the LPWAN slot (slot 11 onwards).

The disclosed method, implementing the said embodiments of a LP-WAN, may be coupled to a Personal Area Network (PAN) system, e.g. Bluetooth Low Energy (BLE), thus adding agility and optimizing the network throughput and power consumption to the overall system. In an embodiment, comprising a coupled PAN and LPWAN, the first will handle the peripheral links at close range and the second at long range. Since a PAN, such as BLE, usually have much higher data rate than a WAN, the system can take advantage of close range operation to transfer higher volumes of data, e.g. logging of activity, temperature, heart-rate, and, at long range, keep a live feed of smaller volumes of data, e.g. navigation data, battery status. The higher data rate additionally improves the interface with the system, the PAN may populate the LPWAN's forwarding tables introducing a new layer of agility, performing tasks such as pairing and/or the reassignment nodes (central or peripheral) to a different network.

An embodiment comprising LPWAN coupled with a PAN, say BLE, the handover of a link from one network to the other is critical. To increase throughput without compromising the maze synchronism the method disclosed proceeds with the handover the link, kept with the BLE master, at close range, say a smartphone, to the maze network central node when the connection is broken, typically when the node gets out of the BLE range. At this point the central node adds a window to its slot, informing every node present of this change, and starts the polling routine. The peripheral node is kept at a BLE discoverable mode and/or advertising mode so that it can reconnect at any time to the smartphone. When it enters the BLE range boundary an intermittent connection could degrade the performance of maze—as it would reconfigure the slot duration multiple times, the LPWAN network having much lower data rate could corrupt the timings of the other nodes it manages. To avoid such behavior the BLE link quality is accessed (RSSI) in order to reconfigure the maze central node conditionally—removing the link from the maze poll only when its bellow a pre-defined/configurable threshold.

The term "comprising" whenever used in this document is intended to indicate the presence of stated features, integers, steps, components, but not to preclude the presence or addition of one or more other features, integers, steps, components or groups thereof. It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order. The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A method for providing a low-power wide area network, LPWAN, by transmitting and receiving signals between a central node and a plurality of peripheral nodes, using a spread-spectrum radio modulation, the method including the steps of:
   predefining a plurality of radio configuration levels by selecting a subset of radio physical layer configurations of all possible radio physical layer configurations, wherein said radio configuration levels are ordered from lower sensitivity processing gain to higher sensitivity processing gain;
   assigning a different channel or a different subset of channels for each peripheral node to communicate with the central node; and communicating using a periodic time slot comprising a plurality of time windows, each said time window being reserved for one respective peripheral node, wherein each said time window is reserved for the central node to poll the respective peripheral node and for the respective peripheral node to respond to the central node polling, using the assigned channel or channels to the respective peripheral node, using a radio configuration level selected from the predefined plurality of radio configuration levels.

2. The method according to claim 1, comprising selecting the radio configuration level according to the link quality between central code and the respective peripheral node.

3. The method according to claim 1, wherein the transmission power of the respective peripheral node is adjustable according to link quality, the method including the steps of:
selecting a radio configuration level with higher sensitivity processing gain if the transmission power is at its maximum, and
selecting a radio configuration level with lower sensitivity processing gain if the transmission power is at its minimum.

4. The method according to claim 1, wherein the duration of said window is equal to the duration of the transmission at the lowest data-rate radio configuration level, of a message having a predetermined maximum message length of said LPWAN.

5. The method according to claim 1, wherein said spread-spectrum radio modulation is a spread-spectrum frequency-modulated chirp radio modulation.

6. The method according to claim 5 wherein the frequency modulated chirp radio modulation is LoRa modulation.

7. The method according to claim 1, comprising:
each peripheral node waiting until its reserved time window for receiving signals from the central node and, when polled by the central node, transmitting signals to the central node within said window, wherein the central node before polling each peripheral node, listens for channel activity and if, channel activity is above a predetermined threshold, skips the window of said peripheral node window and retries the communication with said peripheral node in the window of the same peripheral node of the next slot.

8. The method according to claim 1, for the case where a subset of channels is assigned to each peripheral node,
wherein, for each subset of channels, the channels are used sequentially in each communication, in particular used sequentially and in circular order returning to the first channel after the last channel of said subset is used.

9. The method according to claim 1, comprising adjusting the time duration of the slot on entry or exit of a peripheral node from the network, such that it has a duration equal or greater than the sum of all peripheral node time windows.

10. The method according to claim 1 comprising, for pairing a new peripheral node with the central node:
the central node broadcasting a pair request, said request asking for said new peripheral node to pair with the central node; and
the new peripheral node responding to the central node request to accept said pairing request.

11. The method according to claim 10 comprising the central node informing the peripheral nodes of the new node entry to increase the slot duration in order to accommodate the sum of all peripheral node time windows, wherein the new peripheral node responds to the central node request to accept said pairing request by emitting a burst of confirmation messages.

12. The method according to claim 1 comprising, for power saving by a peripheral node, said peripheral node entering a sleep state and skipping a predetermined number of subsequent slots until exiting said sleep state to resume communications, wherein the predetermined number of subsequent slots of the sleep state to be skipped by the peripheral node is communicated by the central node to the peripheral node.

13. The method according to claim 1 comprising, the central node sending a disconnect command to a peripheral node to switch it to a disconnected state, and after sending said disconnect command, the central node listening during the window of said peripheral node for the peripheral node resumption from the disconnected state.

14. The method according to claim 13 comprising, the peripheral node when resuming from the disconnected state, sending periodically an entry message in bursts until the central node replies with a message that accepts the entry of the peripheral node; the peripheral node transmitting the entry message to the central node in bursts using the lowest sensitivity processing gain radio configuration level and listening to the central node reply using the highest sensitivity processing gain radio configuration level.

15. The method according to claim 1 comprising, a peripheral node on having not received the central node polling messages after a predetermined amount of time, entering an emergency mode which comprises broadcasting an emergency message periodically on an emergency-reserved channel using the highest sensitivity processing gain radio configuration level, the central node listening on the emergency-reserved channel whenever the central node communications are idle.

16. The method according to claim 15, wherein the central node listens on the emergency-reserved channel during windows which have been skipped for power-saving by a peripheral node and/or during the remaining time of a window whose peripheral node communication has not used the window full duration.

17. The method according to claim 1 comprising, connecting any said peripheral node, or said central node, or any said peripheral node and said central node, by a personal area network, PAN, with a PAN master node, defining a table of pair-wise network IDs matching a LPWAN ID with a PAN ID for each node.

18. The method according to claim 17, comprising allocating a reserved time window to a peripheral node by communication with said peripheral node using said PAN; or handing over communication between a peripheral node and the central node, to said PAN or from said PAN, through said PAN master node;
or the LPWAN reserved time window is maintained until communication has been handed over to said PAN and, subsequently, the PAN link RSSI is above a predetermined threshold; or maintaining peripheral node or nodes in a discoverable mode and/or advertising mode on said PAN, such that the PAN master node can resume a PAN communication with a peripheral node that has lost PAN communication using said mode.

19. The method according to claim 17, wherein said PAN is Bluetooth.

20. The method according to claim 17, wherein the PAN master node is a smartphone or a tablet or the LPWAN central node.

21. The method according to claim 19, wherein said PAN is Bluetooth Low Energy, BLE.

22. A non-transitory storage media including program instructions for implementing a low-power wide area network, the program instructions including instructions executable to carry out the method of claim 1.

23. A low-power wide area peripheral node network device or central node network device comprising a non-transitory storage media including program instructions for implementing a low-power wide area network configured for carrying out the method of claim 1.

* * * * *